US012135934B2

(12) United States Patent
Werr et al.

(10) Patent No.: US 12,135,934 B2
(45) Date of Patent: Nov. 5, 2024

(54) METHODS AND SYSTEMS FOR DYNAMIC REPORT GENERATION

(71) Applicant: KOHLBERG KRAVIS ROBERTS & CO. L.P., New York, NY (US)

(72) Inventors: Emil Werr, Wayne, NJ (US); Rafid A. Zane, Kendall Park, NJ (US); Xiaocong Liu, Dix Hills, NY (US)

(73) Assignee: KOHLBERG KRAVIS ROBERTS & CO. L.P., New York, NY (US)

( * ) Notice: Subject to any disclaimer, the term of this patent is extended or adjusted under 35 U.S.C. 154(b) by 0 days.

(21) Appl. No.: 17/747,035

(22) Filed: May 18, 2022

(65) Prior Publication Data

US 2023/0409819 A1    Dec. 21, 2023

(51) Int. Cl.
  *G06F 40/00*  (2020.01)
  *G06F 16/176* (2019.01)
  *G06F 40/18*  (2020.01)
  *G06F 40/186* (2020.01)

(52) U.S. Cl.
  CPC .......... *G06F 40/18* (2020.01); *G06F 16/1767* (2019.01); *G06F 40/186* (2020.01)

(58) Field of Classification Search
  CPC ................. G06F 40/186; G06F 40/18
  See application file for complete search history.

(56) References Cited

U.S. PATENT DOCUMENTS

| 7,197,696 B1* | 3/2007 | Muzumdar | G06F 40/18 |
| | | | 715/209 |
| 7,895,191 B2* | 2/2011 | Colossi | G06F 16/2462 |
| | | | 707/600 |
| 10,817,647 B1* | 10/2020 | Johnson | G06F 16/335 |
| 10,885,021 B1* | 1/2021 | Llorca | G06F 9/45512 |
| 2002/0138636 A1* | 9/2002 | Buttner | G06Q 10/10 |
| | | | 709/217 |
| 2007/0078823 A1* | 4/2007 | Ravindran | G06F 16/283 |
| 2011/0276867 A1* | 11/2011 | Machalek | G06F 40/18 |
| | | | 715/212 |
| 2012/0110001 A1* | 5/2012 | Young | G06F 40/18 |
| | | | 707/769 |
| 2012/0330915 A1* | 12/2012 | Mehra | G06F 16/252 |
| | | | 707/703 |
| 2014/0136936 A1* | 5/2014 | Patel | G06F 16/972 |
| | | | 715/212 |
| 2014/0149839 A1* | 5/2014 | Bedard | G06F 40/18 |
| | | | 715/220 |

(Continued)

*Primary Examiner* — Barbara M Level
(74) *Attorney, Agent, or Firm* — Buchanan Ingersoll & Rooney PC

(57) ABSTRACT

A method, system, and computer program product for dynamic report generation may include a computing device generating a report template including one or more queries that define calls to an external data store. The computing device stores the report template in a report template repository and generates a new report that includes one or more runtime parameters for each of the one or more queries of the report template. The computing device generates the new report by converting the one or more queries of the new report to an agnostic JSON language and retrieves data from an external data store identified in each of the one or more queries and converting the retrieved data to the agnostic JSON language.

20 Claims, 5 Drawing Sheets

(56) References Cited

U.S. PATENT DOCUMENTS

| | | | |
|---|---|---|---|
| 2015/0169652 A1* | 6/2015 | Nuraliev | G06F 16/211 |
| | | | 707/805 |
| 2016/0105459 A1* | 4/2016 | Esary | H04L 63/10 |
| | | | 709/219 |
| 2018/0025063 A1* | 1/2018 | Gupta | G06F 16/2465 |
| | | | 707/722 |
| 2018/0069931 A1* | 3/2018 | Kumar | H04L 67/141 |
| 2019/0057107 A1* | 2/2019 | Bartlett | G06F 21/85 |
| 2020/0125585 A1* | 4/2020 | Bedard | G06F 16/245 |
| 2020/0251111 A1* | 8/2020 | Temkin | G10L 15/22 |
| 2022/0292423 A1* | 9/2022 | Ash | G06Q 30/01 |
| 2022/0334857 A1* | 10/2022 | Lam | G06F 9/5077 |

\* cited by examiner

METHODS AND SYSTEMS FOR DYNAMIC REPORT GENERATION

FIELD

The present disclosure relates to methods, systems, and computer program products for dynamic report generation. More particularly, the present disclosure relates to generating a dynamic report using a unique and novel query language to retrieve data from one or more external data stores to populate a report.

BACKGROUND

Today, many businesses, especially financial institutions, rely on information from various and numerous sources to make informed decisions. Since the amount of information and data businesses rely on is so vast many businesses hire consultants or dedicated employees whose sole purpose is to collect and process that data into easily digestible data reports. These consultants and/or employees must pull data from the various and numerous sources and manually process that data to generate data. Typically, this data report generation involves copying pasting all the collected, relevant data into a spreadsheet and formatting that spreadsheet. This process is incredibly time-consuming and inefficient as it relies on the manual collection and processing of vast amounts of data, which can take days to do. Thus, there is a need for a novel solution to more efficiently and effectively collect and process data for user consumption.

SUMMARY

A method for dynamic report generation is disclosed. The method includes generating, by a processing device, a report template, the report template including one or more queries, each of the one or more queries defining calls to an external data store; generating, by the processing device, a template record for the report template, the template record identifying ownership of the report template; storing, by the processing device, the generated report template in a report template repository; generating, by the processing device, based on the report template, a new report, the new report including one or more runtime parameters for each of the one or more queries of the report template, wherein generating the new report includes: converting, by the processing device, the one or more queries of the new report to an agnostic JSON language; retrieving, by the processing device, based on the one or more queries of the converted new report, data from the external data store identified in each of the one or more queries; and converting, by the processing device, the retrieved data to the agnostic JSON language A system for dynamic report generation is disclosed. The system including one or more processors, one or more computer-readable memories, one or more computer-readable tangible storage devices, and instructions stored on at least one of the one or more storage devices for execution by at least one of the one or more processors via at least one of the one or more computer-readable memories, the instructions comprising: instructions to generate a report template, the report template including one or more queries, each of the one or more queries defining calls to an external data store; instructions to generate a template record for the report template, the template record identifying ownership of the report template; instructions to store the generated report template in a report template repository; instructions to generate based on the report template, a new report, the new report including one or more runtime parameters for each of the one or more queries of the report template, wherein generating the new report includes: instructions to convert the one or more queries of the new report to an agnostic JSON language; instructions to retrieve based on the one or more queries of the converted new report, data from the external data store identified in each of the one or more queries; and instructions to convert the retrieved data to the agnostic JSON language.

A computer program product for dynamic report generation is disclosed. The computer program product including: a computer-readable storage medium having program instructions embodied therewith, the program instructions executable by a computer to cause the computer to perform a method, comprising: generating, by a processing device, a report template, the report template including one or more queries, each of the one or more queries defining calls to an external data store; generating, by the processing device, a template record for the report template, the template record identifying ownership of the report template; storing, by the processing device, the generated report template in a report template repository; generating, by the processing device, based on the report template, a new report, the new report including one or more runtime parameters for each of the one or more queries of the report template, wherein generating the new report includes: converting, by the processing device, the one or more queries of the new report to an agnostic JSON language; retrieving, by the processing device, based on the one or more queries of the converted new report, data from the external data store identified in each of the one or more queries; and converting, by the processing device, the retrieved data to the agnostic JSON language.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

DETAILED DESCRIPTION

As discussed above, current methods of data collection and processing are wholly inefficient requiring the manual processing of vast amounts of data. Exemplary embodiments of the methods and systems provided herein address the issues with the current methods by reducing the manual effort in data collection and processing by creating report templates using a unique query expression language for data retrieval. Embodiments of the methods and systems provided herein leverage existing software, e.g. Microsoft Excel®, as a design tool to create a "what you see is what you get" output by creating data queries formatted to automatically retrieve data from external data stores, and convert that data into an intermediary agnostic representation in JavaScript Object Notation (JSON) which can be transformed to other formats. Thus, exemplary embodiments of the methods and systems provided herein provide a more efficient method to collect and process data for data report generation.

System Overview for Dynamic Report Generation

Figure 1:
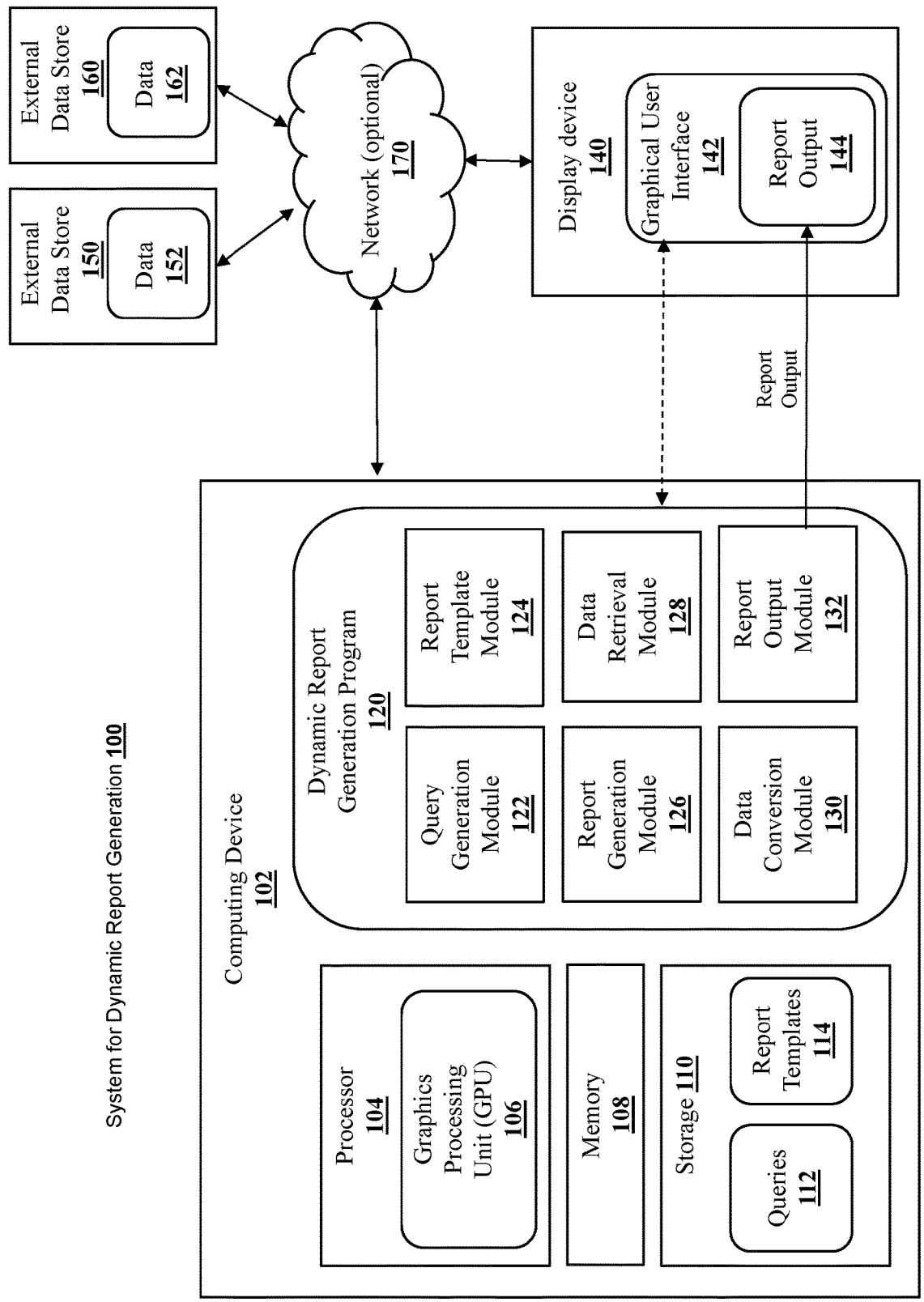
FIG. 1 illustrates a high-level system architecture for dynamic report generation in accordance with exemplary embodiments.

FIG. 1 illustrates system 100 for dynamic report generation in accordance with exemplary embodiments.

The computing device 102 includes, for example, a processor 104, a memory 108, a storage 110, and a dynamic report generation program 120. The computing device 102 may be a desktop computer, a notebook, a laptop computer, a tablet computer, a handheld device, a smart-phone, a thin client, or any other electronic device or computing system capable of storing, compiling, and organizing audio, visual, or textual data and receiving and transmitting that data to and from other computing devices, such as the display device 140, the external data store 150, and/or the external data store 160. For example, the computer system 400 illustrated in FIG. 4 and discussed in more detail below may be a suitable configuration of the computing device 102. While only a single computing device 102 is illustrated, it can be appreciated that any number of computing devices 102 can be a part of the system 100.

The processor 104 may include a graphics processing unit (GPU) 106. The processor 104 may be a special purpose or general purpose processor device specifically configured to perform the functions discussed herein. The processor 104 unit or device as discussed herein may be a single processor, a plurality of processors, or combinations thereof. Processor devices may have one or more processor "cores." In an exemplary embodiment, the processor 104 is configured to perform the functions associated with the modules of the dynamic report generation program 120 as discussed below with reference to FIGS. 2A, 2B, and 3. The GPU 106 may be specially configured to perform the functions of the dynamic report generation program 120 discussed herein. For example, the GPU 106 is configured to process and/or generate graphics associated with the data 152, the data 162, and/or the dynamic report generation program 120 such as, but not limited to, the report output 144.

The memory 108 can be a random access memory, read-only memory, or any other known memory configurations. Further, the memory 108 can include one or more additional memories including the storage 110 in some embodiments. The memory 108 and the one or more additional memories can be read from and/or written to in a well-known manner. In an embodiment, the memory and the one or more additional memories can be non-transitory computer readable recording media. Memory semiconductors (e.g., DRAMs, etc.) can be means for providing software to the computing device such as the dynamic report generation program 120. Computer programs, e.g., computer control logic, can be stored in the memory 108.

The storage 110 can include, for example, queries 112, and report templates 114. The storage 110 can be deployed on one or more nodes, e.g., storage or memory nodes, or one or more processing-capable nodes such as a server computer, desktop computer, notebook computer, laptop computer, tablet computer, handheld device, smart-phone, thin client, or any other electronic device or computing system capable of storing, compiling, and/or processing data and computer instructions (e.g., the queries 112, the report templates 114, the data 152, and/or the data 162, etc.), and receiving and sending that data to and from other devices, such as the display device 140, the external data store 150, and/or the external data store 160. The storage 110 can be any suitable storage configuration, such as, but not limited to, a relational database, a structured query language (SQL) database, a distributed database, or an object database, etc. Suitable configurations and storage types will be apparent to persons having skill in the relevant art.

The queries 112 define calls to one or more external databases (e.g., the external data store 150 and/or the external data store 160) to retrieve data (e.g., the data 152 and/or the data 162). The queries 112 are used to define one or more cells (e.g., a cell in an electronic spreadsheet) in one or more report templates (e.g., report templates 114). For example, a user may create a report template 114 for generating a financial report illustrating the performance of one or more investment funds and/or any other financial account performance over a period of time (e.g., a week, a month, a fiscal quarter, a year, etc.). Continuing with the preceding example, the queries 112 may retrieve one or more data values such as, but not limited to, an investment fund balance, a financial account balance, a stock price, or any other financial data, etc. The queries 112 take external input (e.g., user input via the graphical user interface 142) as parameters to drive query customization. Each of the one or more queries 112 are expressed in a unique and novel format to retrieve the data 152 and/or the data 162. In an embodiment, the queries 112 define calls to metadata of the data (e.g., the data 152 and/or the data 162) stored in to one or more external databases data (e.g., the data 152 and/or the data 162) and to retrieve the data 152 and/or the data 162. For example, the queries 112 may be expressed in a unique and novel language format that follows JavaScript Object Notation (JSON) format. Each of the one or more queries 112 includes, but is not limited to, a symbol character indicating the beginning of the query 112 (e.g., "#"), an expression type (e.g., "query," "constant," "dlquery," etc.), a binding identifier, an attribute identifier, one or more instructions (e.g., one or more instructions for retrieving the data 152 and/or the data 162 from the external data store 150 and/or the external data store 160), and one or more values (e.g., a value to be filled by the data 152 and/or the data 162). For example, a query 112 may expressed as follows: {"<query/constant>":"<category>.<binding_identifier> [<attrbute_level>]", "<instruction1>":"<value1>","<instruction2>":"<value2>"}. The queries 112 create a "what you see is what you get" (WYSIWYG) output. Each of the one or more queries 112 may be bound to a unique identifier and stored in the storage 110. Further, each of the queries 112 may be versioned, categorized (e.g., based on the type of data called by the query 112), and/or include one or more security permissions (e.g., user access permissions). The one or more security permissions may define security permissions for one or more users of the dynamic report generation program 120 such as, but not limited to, query update permissions, and query access (i.e., usage) permissions, etc.

The report templates 114 define the format and content for one or more reports. Each of the report templates 114 include one or more queries 112 for retrieving data (e.g., the data 152 and/or the data 162) from a data repository (e.g., the external data store 150 and/or the external data store 160) to populate the one or more report templates 114 to generate a full report. The report templates 114 may be created by a user of the dynamic report generation program 120 via the graphical user interface 142. In an exemplary embodiment, the report templates 114 may be electronic spreadsheets and one or more of the cells of the electronic spreadsheet may contain a query 112 to populate that cell with a specific piece of data or data value (e.g., the data 152 and/or the data 162). For example, the report templates 114 may be Microsoft Excel® spreadsheet templates and the queries 112 define one or more cells of the Microsoft Excel® spreadsheet templates. The report templates 114 may also include static data entries (i.e., data that remains constant and does not need to be retrieved from a data store). The static data of the report templates 114 may be stored in a local database such as the storage 110 and/or the memory 108, etc. For example, the report templates 114 include static data such as, but are not limited to, date data, account data (e.g., financial account numbers, client account numbers, analyst account numbers, user identification numbers, client identification numbers, etc.), etc. The report templates 114 also include report design features such as, but are not limited to, report titles, column headers, row headers, font type designations, font size designations, font style designations (e.g., font color, font case, bold, italic, underline, highlights, etc.) charts, graphs, images, drawings, or any other suitable document design features, etc. Each of the report templates 114 may be assigned an ownership designation such as, but not limited to, a report designer designation, a client designation (e.g., a client for whom the report is be generated for and/or about), etc. In an embodiment, the ownership designation for each of the report templates 114 defines report access permissions for one or more users of the dynamic report generation program 120 such as, but not limited to, report template update permissions, and report template access (i.e., usage) permissions, etc. The report templates are stored in the storage 110 and are stored in any suitable format such as, but not limited to, a document file format (e.g., PDF, DOC, DOCX, HTML, HTM, XLS, XLSX, TXT files, etc.), or an image file format (e.g., JPG, JPEG, GIF, SVG, PNG, TIFF, TIF files, etc.), etc.

The dynamic report generation program 120 is a software component that utilizes the data 152 and/or the data 162 received from the external data store 150 and/or the external data store 160, the queries 112, and the report templates 114 to generate the report output. In an exemplary embodiment, the dynamic report generation program 120 includes, a query generation module 122, a report template module 124, a report generation module 126, a data retrieval module 128, a data conversion module 130, and a report output module 132. The dynamic report generation program 120 is a software component specifically programmed to implement the methods and functions disclosed herein for generating the report output 144. While the dynamic report generation program 120 and the modules 122-132 are illustrated as a stand-alone software component, it can be appreciated that any one or more functions of the dynamic report generation program 120 can be performed as part of another software component (e.g., a word processing software program, an electronic spreadsheet program, etc.). In an exemplary embodiment, the functions of the dynamic report generation program 120 are performed as part of Microsoft Excel®. For example, the report templates 114 are Microsoft Excel® spreadsheet templates and the queries 112 define one or more cells of the Microsoft Excel® spreadsheet templates. The queries 112 function within Microsoft Excel® to retrieve the data (e.g., the data 152 and/or the data 162). The dynamic report generation program 120 and the modules 122-132 are discussed in more detail below with reference to FIGS. 2A, 2B, and 3.

The dynamic report generation program 120 can include a graphical user interface 142. The graphical user interface 142 can include components used to receive input from the computing device 102, the display device 140, the external data store 150, and/or the external data store 160 and transmit the input to the dynamic report generation program 120 or conversely to receive information from the dynamic report generation program 120 and display the information on the computing device 102, the display device 140, the external data store 150, and/or the external data store 160. In an example embodiment, the graphical user interface 142 uses a combination of technologies and devices, such as device drivers, to provide a platform to enable users of the computing device 102, and/or the display device 140 to interact with the dynamic report generation program 120. In the example embodiment, the graphical user interface 142 receives input from a physical input device, such as a keyboard, mouse, touchpad, touchscreen, camera, microphone, etc. In an exemplary embodiment, the graphical user interface 142 may display a report output 144. While the graphical user interface 142 is illustrated as part of the display device 140, it can be appreciated that the graphical user interface 142 is a part of the dynamic report generation program 120 and may be a part of the computing device 102, and/or the display device 140.

While the processor 104, the memory 108, the storage 110, and the dynamic report generation program 120 are illustrated as part of the computing device 102, it can be appreciated that each of these elements or a combination thereof can be a part of a separate computing device.

The display device 140 can include the graphical user interface 142. The display device 140 be any computing device, such as, but not limited to, a cell phone, a server computer, a desktop computer, a notebook, a laptop computer, a tablet computer, a handheld device, a smart-phone, a thin client, or any other electronic device or computing system capable of receiving display signals from another computing device, such as the computing device 102, the external data store 150, and/or the external data store 160, etc. and outputting those display signals to a display unit such as, but not limited to, an LCD screen, plasma screen, LED screen, DLP screen, CRT screen, etc. For example, the graphical user interface 142 may receive the report output 144 from the dynamic report generation program 120 and display the report output 144 on the display device 140. Further, the graphical user interface 142 may receive data, e.g., the queries 112, the report templates 114, the data 152 and/or the data 162, from a user and transmit that data, e.g., the queries 112, the report templates 114, the data 152 and/or the data 162, to the dynamic report generation program 120. The data input files e.g., the queries 112, the report templates 114, the data 152 and/or the data 162, can include a single piece of data (e.g., a single data file) or multiple pieces of data (e.g., a plurality of data files). The display device 140 may communicate with the computing device 102, the external data store 150, and/or the external data store 160 via a hard-wired connection or via the network 170. For example, the display device 140 may have a hard-wired connection to the computing device 102, the external data store 150, and/or the external data store 160 such as, but not limited to, a USB connection, an HDMI connection, a display port connection, a VGA connection, or any other known hard-wired connection capable of transmitting and/or receiving data between the computing device 102, the external data store 150, and/or the external data store 160.

While the display device 140 is illustrated as being separate from the computing device 102, it can be appreciated that the display device 140 can be a part of the computing device 102. For example, the computer system 400 illustrated in FIG. 4 and discussed in more detail below may be a suitable configuration of the computing device 102, and/or the display device 140.

The external data store 150 can include, for example, the data 152. The external data store 150 can be deployed on one or more nodes, e.g., storage or memory nodes, or one or more processing-capable nodes such as a server computer, desktop computer, notebook computer, laptop computer, tablet computer, handheld device, smart-phone, thin client, or any other electronic device or computing system capable of storing, compiling, and/or processing data and computer instructions (e.g., the data 152) and receiving and sending that data to and from other devices, such as computing device 102, and/or the display device 140. For example, the external data store 150 may be an SAS Institute (SAS®) data repository, an SAP data repository, or any other suitable data repository as will be apparent to those of skill in the art of the present disclosure. The data 152 may be any data generated, stored, and/or required by one or more users of the system 100. For example, but not limited to, the data 152 may be data generated by one or more users of the system 100 or the data 152 may be data generated by third-party systems that the users of the system 100 need access to. The data 152 may include, but is not limited to, document files (e.g., PDF, DOC, DOCX, HTML, HTM, XLS, XLSX, TXT files, etc.), image files (e.g., JPG, JPEG, GIF, SVG, PNG, TIFF, TIF files, etc.), video files (MP4, AVI, MOV, FLV, AVCHD files, etc.), presentation files (e.g., PPT, PPTX, ODP, KEY files, etc.), audio files (M44, MP3, WAV files, etc.), etc. The data files of the data 152 each include metadata such as, but not limited to, descriptive metadata (e.g., a title, an abstract, an author, keywords, etc.), structural metadata (e.g., data container information and how objects within the data are arranged, etc.), administrative data (e.g., resource type, permissions, data creation data, data type, etc.), reference metadata (e.g., information about the contents and quality of statistical data, etc.), statistical metadata (e.g., processes that collect, process, or produce statistical data, etc.), and legal metadata (e.g., data creator information, copyright information, data licensing information, etc.), etc. The external data store 150 can be any suitable storage configuration, such as, but not limited to, a relational database, a structured query language (SQL) database, a distributed database, or an object database, etc. Suitable configurations and storage types will be apparent to persons having skill in the relevant art.

The external data store 160 can include, for example, the data 162. The external data store 160 can be deployed on one or more nodes, e.g., storage or memory nodes, or one or more processing-capable nodes such as a server computer, desktop computer, notebook computer, laptop computer, tablet computer, handheld device, smart-phone, thin client, or any other electronic device or computing system capable of storing, compiling, and/or processing data and computer instructions (e.g., the data 162) and receiving and sending that data to and from other devices, such as computing device 102, and/or the display device 140. For example, the external data store 160 may be an SAS Institute (SAS®) data repository, an SAP data repository, or any other suitable data repository as will be apparent to those of skill in the art of the present disclosure. The data 162 may be any data generated, stored, and/or required by one or more users of the system 100. For example, but not limited to, the data 162 may be data generated by one or more users of the system 100 or the data 162 may be data generated by third-party systems that the users of the system 100 need access to. The data 162 may include, but is not limited to, document files (e.g., PDF, DOC, DOCX, HTML, HTM, XLS, XLSX, TXT files, etc.), image files (e.g., JPG, JPEG, GIF, SVG, PNG, TIFF, TIF files, etc.), video files (MP4, AVI, MOV, FLV, AVCHD files, etc.), presentation files (e.g., PPT, PPTX, ODP, KEY files, etc.), audio files (M44, MP3, WAV files, etc.), etc. The data files of the data 162 each include metadata such as, but not limited to, descriptive metadata (e.g., a title, an abstract, an author, keywords, etc.), structural metadata (e.g., data container information and how objects within the data are arranged, etc.), administrative data (e.g., resource type, permissions, data creation data, data type, etc.), reference metadata (e.g., information about the contents and quality of statistical data, etc.), statistical metadata (e.g., processes that collect, process, or produce statistical data, etc.), and legal metadata (e.g., data creator information, copyright information, data licensing information, etc.), etc. The external data store 160 can be any suitable storage configuration, such as, but not limited to, a relational database, a structured query language (SQL) database, a distributed database, or an object database, etc. Suitable configurations and storage types will be apparent to persons having skill in the relevant art.

The optional network 170 may be any network suitable for performing the functions as disclosed herein and may include a local area network (LAN), a wide area network (WAN), a wireless network (e.g., WiFi), a personal area network (PAN) (e.g. Bluetooth), a near-field communication (NFC) network, a mobile communication network, a satellite network, the Internet, fiber optic, coaxial cable, other hardwired networks, infrared, radio frequency (RF), or any combination of the foregoing. Other suitable network types and configurations will be apparent to persons having skill in the relevant art. In general, the network 170 can be any combination of connections and protocols that will support communications between the computing device 102, the display device 140, the external data store 150, and/or the external data store 160. In some embodiments, the network 170 may be optional based on the configuration of the computing device 102, the display device 140, the external data store 150, and/or the external data store 160.

Exemplary Process for Dynamic Report Generation

Figure 2A:
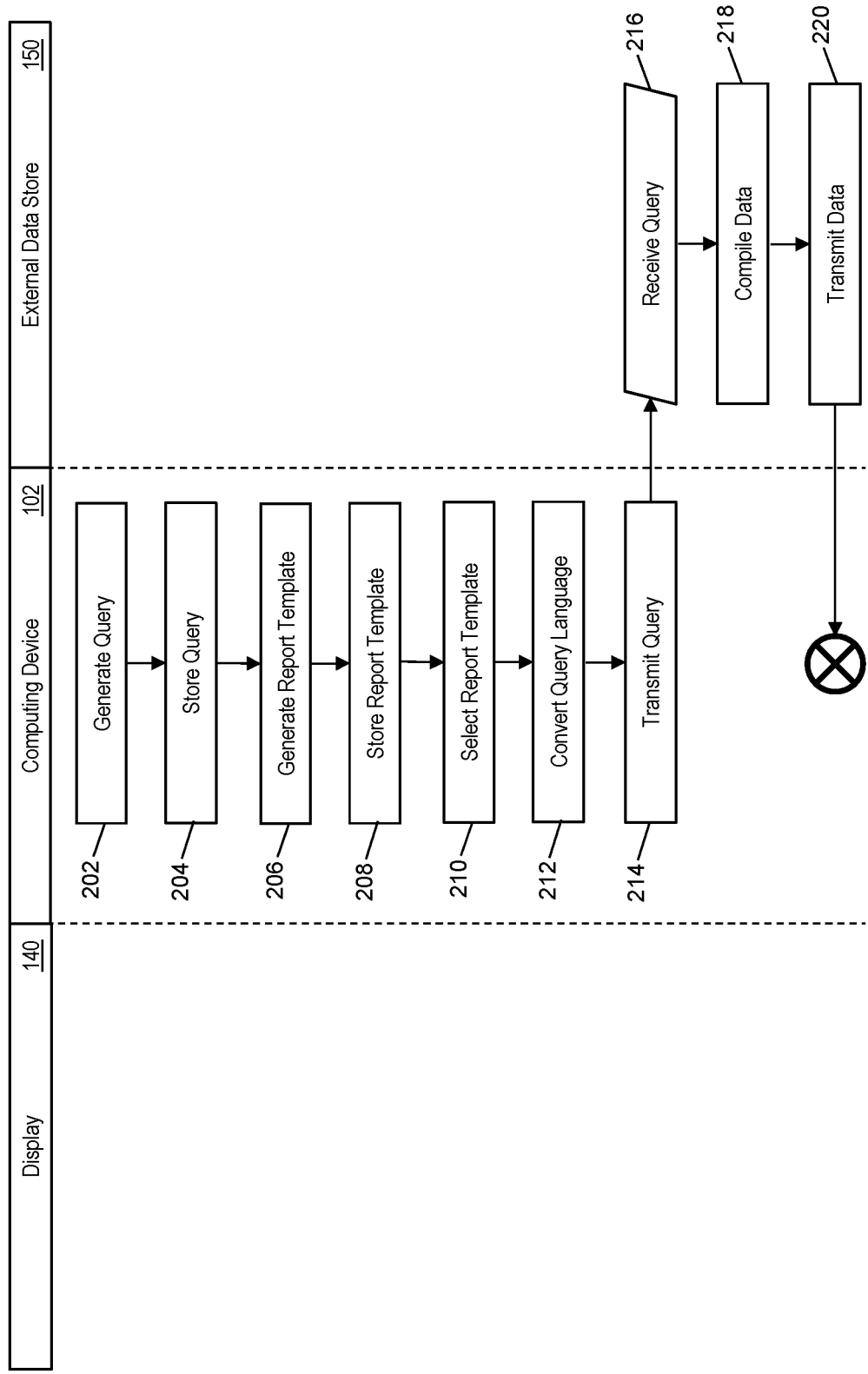
FIGS. 2A-2B is a flow chart illustrating a process for dynamic report generation in accordance with exemplary embodiments.
Figure 2B:
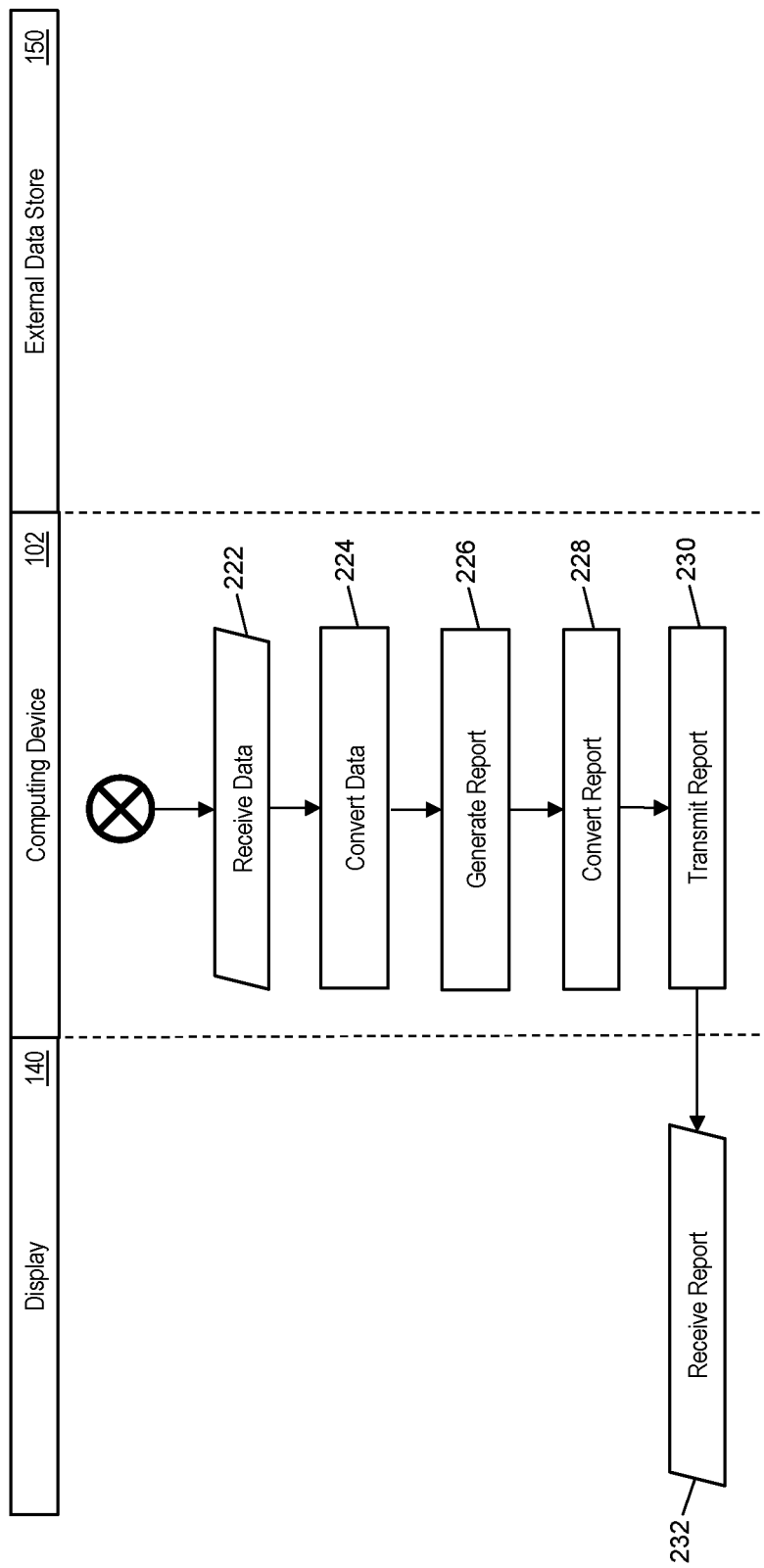

FIGS. 2A-2B illustrates a process for dynamic report generation in the system 100 of FIG. 1.

In step 202, the computing device 102 generates one or more queries 112. Each of the one or more queries 112 defines a call to an external data store (e.g., the external data store 150 and/or the external data store 160) to retrieve data (e.g., the data 152 and/or the data 162). The one or more queries 112 may be generated by a user of the dynamic report generation program 120 via the graphical user interface 142. In an exemplary embodiment, the queries 112 define calls external data repositories that store financial data and/or finance market performance data such as, but not limited to, investment fund data, private equity fund data, investment account data, financial performance data, financial entity data, or any other suitable financial data, etc. In an exemplary embodiment, the query generation module 122 of the dynamic report generation program 120 can be configured to execute step 202.

In step 204, the computing device 102 stores the one or more queries 112 in the storage 110. The queries 112 may be stored with defined security permissions (e.g., user access permissions). The one or more security permissions may define security permissions for one or more users of the dynamic report generation program 120 such as, but not limited to, query update permissions, and query access (i.e., usage) permissions, etc. In an exemplary embodiment, the query generation module 122 of the dynamic report generation program 120 can be configured to execute step 204.

In step 206, the computing device 102 generates a report template 114. The report templates may be generated by a user of the dynamic report generation program 120 via the graphical user interface 142. The report template 114 includes one or more queries 112 defining one or more data input points of the report template 114. For example, the report template may be an electronic spreadsheet (e.g., a Microsoft Excel® spreadsheet), and one or more cells of the electronic spreadsheet may contain one or more queries 112. The report templates 114 may include one or more static data entries (e.g., data that is stored locally to the computing device 102 such as in the memory 108 and/or the storage 110). The report templates include one or more design features such as, but are not limited to, report titles, column headers, row headers, font type designations, font size designations, font style designations (e.g., font color, font case, bold, italic, underline, highlights, etc.) charts, graphs, images, drawings, or any other suitable document design features, etc. Each of the report templates 114 may be assigned an ownership designation such as, but not limited to, a report designer designation, a client designation (e.g., a client for whom the report is to be generated for and/or about), etc. In an embodiment, the ownership designation for each of the report templates 114 defines report access permissions for one or more users of the dynamic report generation program 120 such as, but not limited to, report template update permissions, and report template access (i.e., usage) permissions, etc. In an exemplary embodiment, each of the report templates 114 are financial report templates. For example, a report template 114 may be a client investment report template (e.g., a summary of client investments), a fund performance report, a financial analyst fund report (e.g., a summary of investments, stocks, companies, etc. monitored by a financial analyst), a private equity report, etc. In an exemplary embodiment, the report template module 124 of the dynamic report generation program 120 can be configured to execute step 206.

In step 208, the computing device 102 stores the generated report template 114 in a report template repository (e.g., the storage 110). The report templates 114 are stored in the storage 110 and are stored in any suitable format such as, but not limited to, a document file format (e.g., PDF, DOC, DOCX, HTML, HTM, XLS, XLSX, TXT files, etc.), or an image file format (e.g., JPG, JPEG, GIF, SVG, PNG, TIFF, TIF files, etc.), etc. The report template 114 may include an ownership designation that defines report template 114 access permissions for one or more users of the dynamic report generation program 120 such as, but not limited to, report template update permissions, and report template access (i.e., usage) permissions, etc. In an exemplary embodiment, the report generation module 126 of the dynamic report generation program 120 can be configured to execute step 208.

In step 210, the computing device 102 selects a report template 114. For example a user of the dynamic report generation program 120 may select a report template 114 from the storage 110 via the graphical user interface 142. In an embodiment, the dynamic report generation program 120 may automatically select a report template 114 from the storage 110 for report generation. For example, the dynamic report generation program 120 may be configured to generate a report using the report template 114 at defined intervals such as, but not limited to, every day, every week, every month, every financial quarter, every year, etc. In an exemplary embodiment, the report generation module 126 of the dynamic report generation program 120 can be configured to execute step 210.

In step 212, the computing device 102 converts the one or more queries 112 of the selected report template 114 to an agnostic JSON language. In an exemplary embodiment, the report generation module 126 of the dynamic report generation program 120 can be configured to execute step 212.

In step 214, the computing device 102 transmits the converted each of the one or more queries 112 to the data repository (e.g., the external data store 150 and/or the external data store 160, etc.) designated by each of the queries 112. The one or more queries 112 may be transmitted to the data repository (e.g., the external data store 150 and/or the external data store 160, etc.) using any suitable communication method (e.g., the network 170). In an exemplary embodiment, the data retrieval module 128 of the dynamic report generation program 120 can be configured to execute step 214.

In step 216, the external data store 150 (and/or the external data store 160) receives the one or more queries 112 and compiles the data identified by the one or more queries 112 at step 218. The external data store 150 (and/or the external data store 160) may search a local or remote database for the data identified by the one or more queries 112 or in turn may submit a request to a third computing device for the data identified by the one or more queries 112.

In step 220, the external data store 150 (and/or the external data store 160) transmits the data identified by the one or more queries 112 to the computing device 102. The external data store 150 (and/or the external data store 160) may transmit the data identified by the one or more queries 112 to the computing device 102 using any suitable communication method (e.g., the network 170).

In step 222, the computing device 102 receives the data identified by the one or more queries 112. In an embodiment, the computing device 102 may store the data received from the external data store 150 (and/or the external data store 160). For example, the computing device 102 may temporarily store the data received from the external data store 150 (and/or the external data store 160) in the memory 108, the storage 110, or data cache of the computing device 102 and/or the dynamic report generation program 120. In an exemplary embodiment, the data retrieval module 128 of the dynamic report generation program 120 can be configured to execute step 222.

In step 224, the computing device 102 converts the retrieved data to an agnostic JSON language. In an exemplary embodiment, the data conversion module 130 of the dynamic report generation program 120 can be configured to execute step 224.

In step 226, the computing device 102 generates a new report based on the report template 114 selected at step 210. The new report includes one or more runtime parameters for each of the one or more queries 112 of the report template 114. In an exemplary embodiment, the report generation module 126 of the dynamic report generation program 120 can be configured to execute step 226.

In step 228, the computing device 102 converts the new report to an output format (e.g., the report output 144). For example, the computing device 102 converts the new report to one or more of, but not limited to, an excel spreadsheet, a PDF document, an html document, or any other suitable report output format. The format of the new report (e.g., the report output 144) may be selected by a user of the dynamic report generation program 120 via the graphical user interface 142 or the dynamic report generation program 120 may convert the new report to a default format type. In an exemplary embodiment, the report generation module 126 of the dynamic report generation program 120 can be configured to execute step 228.

In step 230, the computing device 102 outputs the new report (e.g., the report output 144) to one or more devices (e.g., the display device 140). For example, the computing device 102 may display the new report (e.g., the report output) to a user of the dynamic report generation program 120 via the graphical user interface 142 on the display device 140. In an embodiment, the computing device 102 may output the new report (e.g., the report output 144) to any user designated user device or destination address (e.g., designated via the graphical user interface 142). For example, the computing device 102 may output the new report (e.g., the report output 144) to an e-mail address, a database, etc. The computing device 102 may output the new report (e.g., the report output 144) using any suitable communication method (e.g., the network 170). In an exemplary embodiment, the report output module 132 of the dynamic report generation program 120 can be configured to execute step 230.

In step 232, the display device 140 receives the new report (e.g., the report output 144) and displays the new report (e.g., the report output 144) via the graphical user interface 142.

Exemplary Method for Dynamic Report Generation

Figure 3:
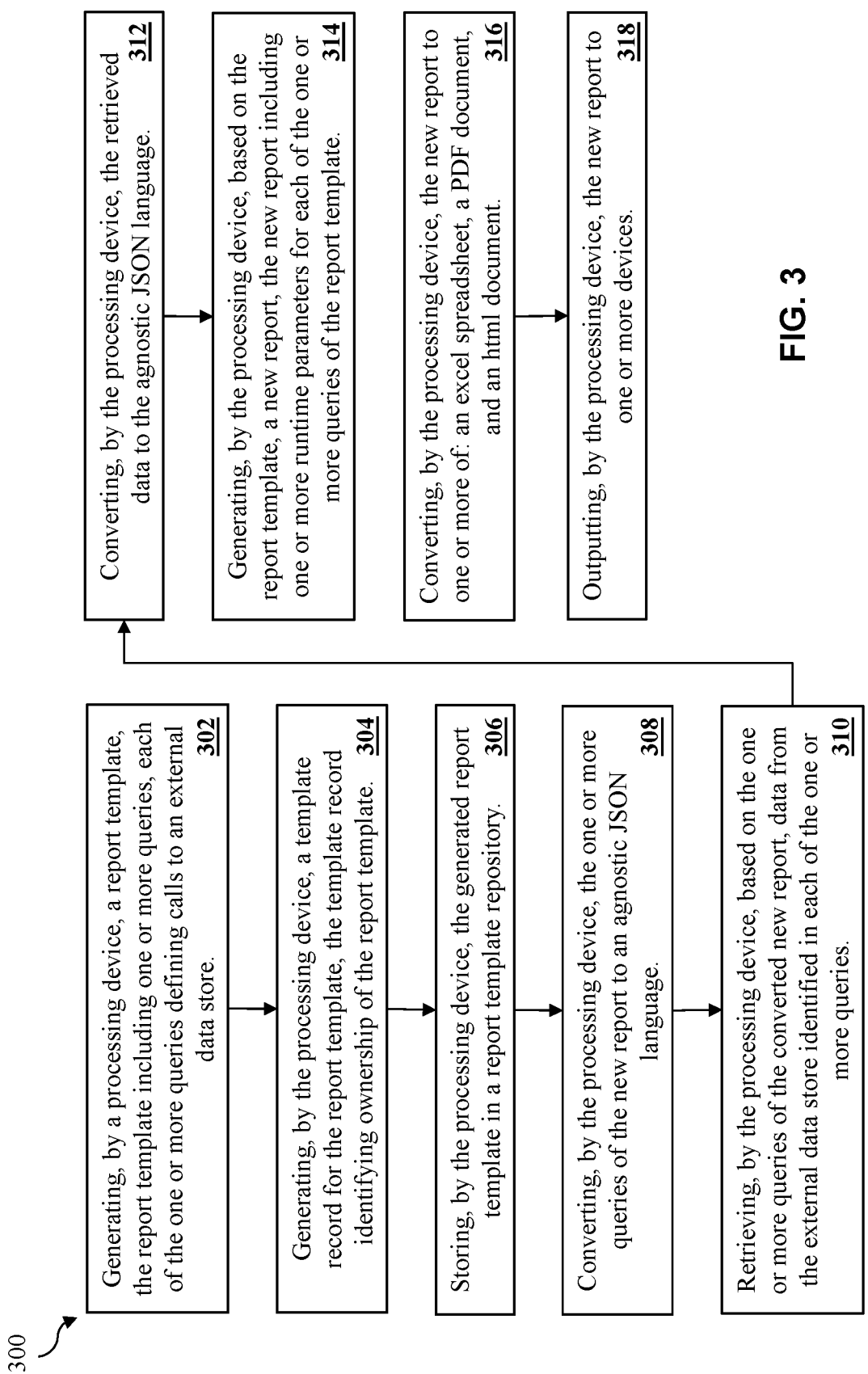
FIG. 3 is a flowchart illustrating a method for dynamic report generation in accordance with exemplary embodiments.

FIG. 3 illustrates a method 300 for dynamic report generation in accordance with exemplary embodiments.

The method 300 can include block 302 of generating, by a processing device (e.g., the computing device 102), a report template (e.g., a report template 114). The report template includes, but is not limited to, one or more queries (e.g., the queries 112). Each of the one or more queries (e.g., the queries 112) define calls to an external data store (e.g., the external data store 150 and/or the external data store 160). Each of the one or more queries (e.g., the queries 112) is bound to a unique identifier that identifies a type of query. The report template (e.g., the report template 114) is generated as an excel spreadsheet and the one or more queries (e.g., the queries 112) define one or more cells of the excel spreadsheet. In an embodiment, the report template (e.g., the report template 114) is financial report template. In an exemplary embodiment, report template module 124 of the dynamic report generation program 120 can be configured to execute the method of block 302.

The method 300 can include block 304 of generating, by the processing device (e.g., the computing device 102), a template record for the report template (e.g., the report template 114). The template record identifies ownership of the report template (e.g., the report template 114). The template record defines one or more access controls to the report template (e.g., the report template 114). In an exemplary embodiment, the report template module 124 of the dynamic report generation program 120 can be configured to execute the method of block 304.

The method 300 can include block 306 of storing, by the processing device (e.g., the computing device 102), the generated report template (e.g., the report template 114) in a report template repository (e.g., the storage 110). In an exemplary embodiment, the report template module 124 of the dynamic report generation program 120 can be configured to execute the method of block 306.

The method 300 can include block 308 of converting, by the processing device (e.g., the computing device 102), the one or more queries (e.g., the queries 112) of the new report to an agnostic JSON language. In an exemplary embodiment, the report generation module 126 of the dynamic report generation program 120 can be configured to execute the method of block 308.

The method 300 can include block 310 of retrieving, by the processing device (e.g., the computing device 102), based on the one or more queries (e.g., the queries 112) of the converted new report, data (e.g., the data 152 and/or the data 162) from the external data store (e.g., the external data store 150 and/or the external data store 160) identified in each of the one or more queries (e.g., the queries 112). In an exemplary embodiment, the data retrieval module 128 of the dynamic report generation program 120 can be configured to execute the method of block 310.

The method 300 can include block 312 of converting, by the processing device (e.g., the computing device 102), the retrieved data (e.g., the data 152 and/or the data 162) to the agnostic JSON language. In an exemplary embodiment, the data conversion module 130 of the dynamic report generation program 120 can be configured to execute the method of block 312.

The method 300 can include block 314 of generating, by the processing device (e.g., the computing device 102), based on the report template (e.g., the report template 114), a new report. The new report includes at least, but not limited to, one or more runtime parameters for each of the one or more queries (e.g., the queries 112) of the report template (e.g., the report template 114). In an exemplary embodiment, the report generation module 126 of the dynamic report generation program 120 can be configured to execute the method of block 314.

The method 300 can include block 316 of converting, by the processing device (e.g., the computing device 102), the new report to one or more of, but not limited to, an excel spreadsheet, a PDF document, or an html document. In an exemplary embodiment, the report generation module 126 of the dynamic report generation program 120 can be configured to execute the method of block 316.

The method 300 can include block 318 of outputting, by the processing device (e.g., the computing device 102), the new report to one or more devices (e.g., the display device 140). In an exemplary embodiment, the report output module 132 of the dynamic report generation program 120 can be configured to execute the method of block 318.

Computer System Architecture

Figure 4:
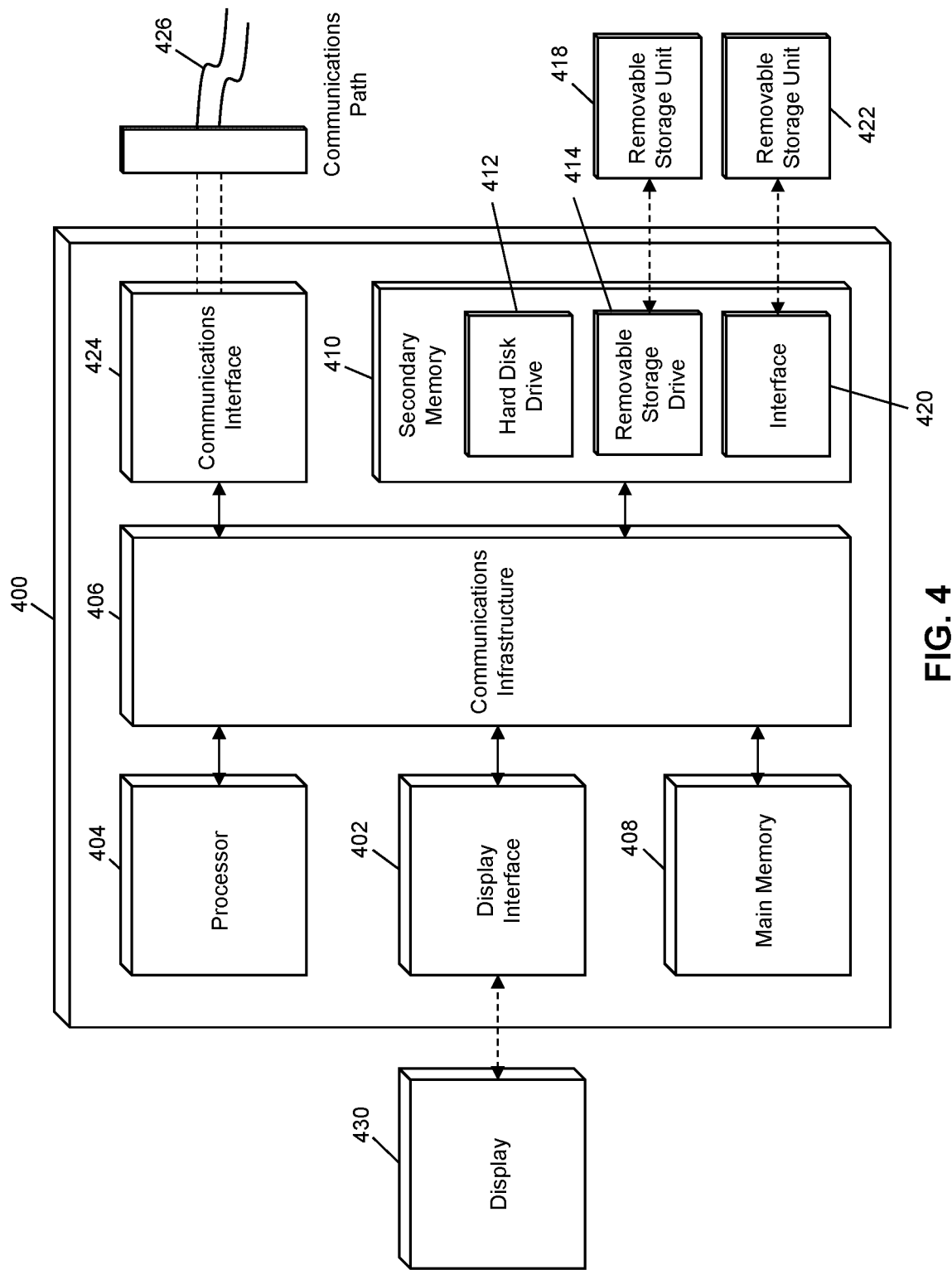
FIG. 4 is a block diagram illustrating a computer system architecture in accordance with exemplary embodiments.

FIG. 4 illustrates a computer system 400 in which embodiments of the present disclosure, or portions thereof, may be implemented as computer-readable code. For example, the computing device 102, the display device 140, the external data store 150, and/or the external data store 160 of FIG. 1 may be implemented in the computer system 400 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 2A, 2B, and 3.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 418, a removable storage unit 422, and a hard disk installed in hard disk drive 412.

Various embodiments of the present disclosure are described in terms of this example computer system 400. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 404 may be a special purpose or a general purpose processor device specifically configured to perform the functions discussed herein. The processor device 404 may be connected to a communications infrastructure 406, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 400 may also include a main memory 408 (e.g., random access memory, read-only memory, etc.), and may also include a secondary memory 410. The secondary memory 410 may include the hard disk drive 412 and a removable storage drive 414, such as a floppy disk drive, a magnetic tape drive, an optical disk drive, a flash memory, etc.

The removable storage drive 414 may read from and/or write to the removable storage unit 418 in a well-known manner. The removable storage unit 418 may include a removable storage media that may be read by and written to by the removable storage drive 414. For example, if the removable storage drive 414 is a floppy disk drive or universal serial bus port, the removable storage unit 418 may be a floppy disk or portable flash drive, respectively. In one embodiment, the removable storage unit 418 may be non-transitory computer readable recording media.

In some embodiments, the secondary memory 410 may include alternative means for allowing computer programs or other instructions to be loaded into the computer system 400, for example, the removable storage unit 422 and an interface 420. Examples of such means may include a program cartridge and cartridge interface (e.g., as found in video game systems), a removable memory chip (e.g., EEPROM, PROM, etc.) and associated socket, and other removable storage units 422 and interfaces 420 as will be apparent to persons having skill in the relevant art.

Data stored in the computer system 400 (e.g., in the main memory 408 and/or the secondary memory 410) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 400 may also include a communications interface 424. The communications interface 424 may be configured to allow software and data to be transferred between the computer system 400 and external devices. Exemplary communications interfaces 424 may include a modem, a network interface (e.g., an Ethernet card), a communications port, a PCMCIA slot and card, etc. Software and data transferred via the communications interface 424 may be in the form of signals, which may be electronic, electromagnetic, optical, or other signals as will be apparent to persons having skill in the relevant art. The signals may travel via a communications path 426, which may be configured to carry the signals and may be implemented using wire, cable, fiber optics, a phone line, a cellular phone link, a radio frequency link, etc.

The computer system 400 may further include a display interface 402. The display interface 402 may be configured to allow data to be transferred between the computer system 400 and external display 430. Exemplary display interfaces 402 may include high-definition multimedia interface (HDMI), digital visual interface (DVI), video graphics array (VGA), etc. The display 430 may be any suitable type of display for displaying data transmitted via the display interface 402 of the computer system 400, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 408 and secondary memory 410, which may be memory semiconductors (e.g., DRAMs, etc.). These computer program products may be means for providing software to the computer system 400. Computer programs (e.g., computer control logic) may be stored in the main memory 408 and/or secondary memory 410. Computer programs may also be received via the communications interface 424. Such computer programs, when executed, may enable computer system 400 to implement the present methods as discussed herein. In particular, the computer programs, when executed, may enable processor device 404 to implement the processes and methods illustrated by FIGS. 2A, 2B, and 3, as discussed herein. Accordingly, such computer programs may represent controllers of the computer system 400. Where the present disclosure is implemented using software, the software may be stored in a computer program product and loaded into the computer system 400 using the removable storage drive 414, interface 420, and hard disk drive 412, or communications interface 424.

The processor device 404 may comprise one or more modules or engines configured to perform the functions of the computer system 400. Each of the modules or engines may be implemented using hardware and, in some instances, may also utilize software, such as corresponding to program code and/or programs stored in the main memory 408 or secondary memory 410. In such instances, program code may be compiled by the processor device 404 (e.g., by a compiling module or engine) prior to execution by the hardware of the computer system 400. For example, the program code may be source code written in a programming language that is translated into a lower level language, such as assembly language or machine code, for execution by the processor device 404 and/or any additional hardware components of the computer system 400. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 400 to perform the functions disclosed herein. It will be apparent to persons having skill in the relevant art that such processes result in the computer system 400 being a specially configured computer system 400 uniquely programmed to perform the functions discussed above.

Techniques consistent with the present disclosure provide, among other features, systems and methods for dynamic report generation. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter. It will be appreciated by those skilled in the art that the present disclosure can be embodied in other specific forms without departing from the spirit or essential characteristics thereof. The presently disclosed embodiments are therefore considered in all respects to be illustrative and not restrictive. The scope of the disclosure is indicated by the appended claims rather than the foregoing description, and all changes that come within the meaning, range, and equivalence thereof are intended to be embraced therein.

What is claimed is:

1. A method for dynamic report generation, the method comprising:
    generating, by a processing device, a report template, the report template including one or more queries, each of the one or more queries defining calls to metadata of one or more external data stores, and wherein the each of the one or more queries includes an expression type, a binding identifier, an attribute identifier, one or more instructions, and one or more values;
    customizing, by the processing device, one or more parameters of the one or more queries by an external input from a user;
    generating, by the processing device, a template record for the report template, the template record identifying ownership of the report template;
    storing, by the processing device, the generated report template in a report template repository; and
    generating, by the processing device, based on the report template, a new report, the new report including one or more runtime parameters for each of the one or more queries of the report template, the one or more queries of the report template including the one or more parameters customized by the external input from the user, and wherein generating the new report includes:
        converting, by the processing device, the one or more queries of the new report to an agnostic JSON language;
        retrieving, by the processing device, based on the one or more queries of the converted new report, data from the one or more external data stores identified in each of the one or more queries;
        applying, by the processing device, the one or more runtime parameters for the each of the one or more queries to the retrieved data from the one or more external data stores;
        converting, by the processing device, the retrieved data from the one or external data stores with the one or more runtime paraments to the agnostic JSON language; and
        generating, by the processing device, the new report based on an output format selected by the user.

2. The method of claim 1, further comprising:
    outputting, by the processing device, the new report to one or more devices, wherein outputting the new report includes:
        converting, by the processing device, the new report to one or more of:
            an electronic spreadsheet, a PDF document, and an html document.

3. The method of claim 1, wherein each query is bound to a unique identifier, the unique identifier identifying a type of query.

4. The method of claim 1, wherein the report template is generated as an electronic spreadsheet, and the one or more queries defines one or more cells of the electronic spreadsheet, and wherein the electronic spreadsheet includes one or more static data entries retrieved from a local database or memory of the processing device, the local database or memory of the processing device being different than the one or more external data stores.

5. The method of claim 1, wherein the report template is financial report template.

6. The method of claim 1, wherein the template record defines one or more access controls to the report template.

7. The method of claim 1, further comprising:
    outputting, by the processing device, the new report as an electronic spreadsheet to one or more devices.

8. The method of claim 1, wherein the data from the one or more external stores identified in each of the one or more queries includes data from at least two external data stores, and wherein the at least two external data stores are one or more of a relational database, a structured query language (SQL) database a distributed database, and an object database.

9. A system for dynamic report generation, the system comprising:
    one or more processors, one or more computer-readable memories, one or more computer-readable tangible storage devices, and instructions stored on at least one of the one or more storage devices for execution by at least one of the one or more processors via at least one of the one or more computer-readable memories, the instructions comprising:
        instructions to generate a report template, the report template including one or more queries, each of the one or more queries defining calls to metadata of one or more external data stores, and wherein the each of the one or more queries includes an expression type, a binding identifier, an attribute identifier, one or more instructions, and one or more values;

instructions to customize one or more parameters of the one or more queries by an external input from a user;

instructions to generate a template record for the report template, the template record identifying ownership of the report template;

instructions to store the generated report template in a report template repository; and instructions to generate based on the report template, a new report, the new report including one or more runtime parameters for each of the one or more queries of the report template, the one or more queries of the report template including the one or more parameters customized by the external input from the user, and wherein generating the new report includes:

instructions to convert the one or more queries of the new report to an agnostic JSON language;

instructions to retrieve based on the one or more queries of the converted new report, data from the one or more external data stores identified in each of the one or more queries;

instructions to apply the one or more runtime parameters for the each of the one or more queries to the retrieved data from the one or more external data stores;

instructions to convert the retrieved data from the one or external data stores with the one or more runtime paraments to the agnostic JSON language; and instructions to generate the new report based on an output format selected by the user.

10. The system of claim 9, further comprising:

instructions to output the new report to one or more devices, wherein outputting the new report includes:

instructions to convert the new report to one or more of: an electronic spreadsheet, a PDF document, and an html document.

11. The system of claim 9, wherein each query is bound to a unique identifier, the unique identifier identifying a type of query.

12. The system of claim 9, wherein the report template is generated as an electronic spreadsheet, and the one or more queries defines one or more cells of the electronic spreadsheet, and wherein the electronic spreadsheet includes one or more static data entries retrieved from a local database or memory of the processing device, the local database or memory of the processing device being different than the one or more external data stores.

13. The system of claim 9, wherein the report template is financial report template.

14. The system of claim 9, wherein the template record defines one or more access controls to the report template.

15. A computer program product for dynamic report generation, the computer program product comprising:

a non-transitory computer-readable storage medium having program instructions embodied therewith, the program instructions executable by a computer to cause the computer to perform a method, comprising:

generating, by a processing device, a report template, the report template including one or more queries, each of the one or more queries defining calls to metadata of one or more external data stores, and wherein the each of the one or more queries includes an expression type, a binding identifier, an attribute identifier, one or more instructions, and one or more values;

customizing, by the processing device, one or more parameters of the one or more queries by an external input from a user;

generating, by the processing device, a template record for the report template, the template record identifying ownership of the report template;

storing, by the processing device, the generated report template in a report template repository; and generating, by the processing device, based on the report template, a new report, the new report including one or more runtime parameters for each of the one or more queries of the report template, the one or more queries of the report template including the one or more parameters customized by the external input from the user, and wherein generating the new report includes:

converting, by the processing device, the one or more queries of the new report to an agnostic JSON language;

retrieving, by the processing device, based on the one or more queries of the converted new report, data from the one or more external data stores identified in each of the one or more queries;

applying, by the processing device, the one or more runtime parameters for the each of the one or more queries to the retrieved data from the one or more external data stores;

converting, by the processing device, the retrieved data from the one or external data stores with the one or more runtime paraments to the agnostic JSON language; and generating, by the processing device, the new report based on an output format selected by the user.

16. The computer program product of claim 15, further comprising:

outputting, by the processing device, the new report to one or more devices, wherein outputting the new report includes:

converting, by the processing device, the new report to one or more of: an electronic spreadsheet, a PDF document, and an html document.

17. The computer program product of claim 15, wherein each query is bound to a unique identifier, the unique identifier identifying a type of query.

18. The computer program product of claim 15, wherein the report template is generated as an electronic spreadsheet, and the one or more defines one or more cells of the electronic spreadsheet, and wherein the electronic spreadsheet includes one or more static data entries retrieved from a local database or memory of the processing device, the local database or memory of the processing device being different than the one or more external data stores.

19. The computer program product of claim 15, wherein the report template is financial report template.

20. The computer program product of claim 15, wherein the template record defines one or more access controls to the report template.

* * * * *